(12) United States Patent
Ahmed et al.

(10) Patent No.: US 12,454,464 B1
(45) Date of Patent: Oct. 28, 2025

(54) CALCIUM TITANATE/MAGNESIUM TITANATE/CARBON-BASED NANOCOMPOSITE

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/210,181

(22) Filed: May 16, 2025

(51) Int. Cl.
*C01G 23/00* (2006.01)
*B82Y 30/00* (2011.01)

(52) U.S. Cl.
CPC ............ *C01G 23/006* (2013.01); *B82Y 30/00* (2013.01); *C01P 2002/60* (2013.01); *C01P 2002/76* (2013.01); *C01P 2002/85* (2013.01); *C01P 2004/03* (2013.01); *C01P 2004/04* (2013.01); *C01P 2004/32* (2013.01); *C01P 2004/50* (2013.01); *C01P 2004/64* (2013.01); *C01P 2004/80* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 6,114,079 A | 9/2000 | Christian et al. | |
| 6,348,292 B1* | 2/2002 | Pan | G03G 9/135 399/251 |
| 2004/0167257 A1* | 8/2004 | Ryang | C09C 3/006 524/262 |
| 2008/0280152 A1* | 11/2008 | Aneziris | C04B 35/013 428/471 |

(Continued)

FOREIGN PATENT DOCUMENTS

| | | |
|---|---|---|
| KR | 10-2010-0000377 A | 1/2010 |
| KR | 10-2017-0067083 A | 6/2017 |

OTHER PUBLICATIONS

Byoung Duk Lee, et al., "Microwave Dielectric Properties of CaTiO3 and MgTiO3 Thin Films", Japanese Journal of Applied Physics, vol. 42, No. 9S, Sep. 1, 2003, 6158, Abstract only, 2 pages.

(Continued)

*Primary Examiner* — Stefanie J Cohen
(74) *Attorney, Agent, or Firm* — Oblon, McClelland, Maier &Neustadt, L.L.P.

(57) ABSTRACT

A porous particulate nanocomposite material comprising, as determined by X-ray diffraction: carbon; an orthorhombic $CaTiO_3$ crystalline phase; and, a rhombohedral $MgTiO_3$ crystalline phase. Based on the total number of atoms in the nanocomposite material and as determined by energy dispersive X-ray spectroscopy (EDX): the atomic concentration of carbon (C) is from about 1 to about 5 atom % (at. %); the atomic concentration of titanium (Ti) is from about 20 to about 35 at. %; the atomic concentration of magnesium (Mg) is from about 5 to about 15 at. %; and, the atomic concentration of calcium (Ca) is from about 5 to about 15 at. %.

20 Claims, 5 Drawing Sheets

(56) References Cited

U.S. PATENT DOCUMENTS

2020/0269217 A1   8/2020  Ko et al.
2021/0246243 A1*  8/2021  Dubois .................... C08K 3/01

OTHER PUBLICATIONS

Hao Li, et al., "Rapid preparation of MgTiO3—CaTiO3 microwave ceramics with high quality factor Q via microwave-assisted sintering", Ceramics International, vol. 50, Issue 22, Part A, Nov. 15, 2024, pp. 44928-44934, Excerpts only, 4 pages.

Himani Kalita, et al., "Fabrication and characterization of polyvinyl alcohol/metal (Ca, Mg, Ti) doped zirconium phosphate nanocomposite films for scaffold-guided tissue engineering application", Materials Science and Engineering: C, vol. 71, Sep. 29, 2016, pp. 363-371.

* cited by examiner

CALCIUM TITANATE/MAGNESIUM TITANATE/CARBON-BASED NANOCOMPOSITE

BACKGROUND

Technical Field

The present disclosure is directed to a nanocomposite, and more particularly, relates to a porous particulate nanocomposite comprising carbon, calcium titanate and magnesium titanate and to a method of production thereof.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Presently, advanced nanocomposite materials are of utmost importance in various industrial applications, including, but not limited to, catalysis, energy storage, and electronic devices. Advanced nanocomposites possess a high surface area, tunable porosity, superior mechanical strength, and enhanced thermal and chemical stability, which renders the nanocomposites desirable for the aforementioned applications. Further, the ability of the nanocomposites to exhibit unique electrical, optical, and catalytic properties due to controlled nanoscale interactions further increases the utility of the nanocomposite across various fields of application. However, existing nanocomposites may exhibit significant limitations in achieving a balance between structural stability, high porosity, and multi-functionality. Titanium oxide-based materials, in particular, have been widely researched for their potential in the aforementioned applications, yet challenges persist in integrating multiple crystalline phases while maintaining precise control over morphology and crystallite size.

Current solutions in the field primarily focus on single-phase materials or binary composites, which restrict the ability of the solutions to provide enhanced structural and functional properties. Various synthesis techniques, such as hydrothermal, sol-gel, and solid-state reactions, have been employed to develop titanium oxide-based composites. Despite these efforts, the resulting materials frequently suffer from non-uniform phase distribution, uncontrolled particle size, and inadequate porosity, reducing the performance of the nanocomposites in applications requiring high surface area and stability.

The limitations of the existing materials highlight a requirement for a new approach to nanocomposite synthesis. Many traditional fabrication techniques require high temperatures or complex processing steps, leading to increased production costs and energy consumption. Furthermore, single-phase and binary materials cannot often simultaneously achieve high crystallinity, controlled morphology, and optimized porosity. The above-listed factors create a demand for a nanocomposite that overcomes the challenges explained herein while offering improved performance across multiple fields of application.

Accordingly, one object of the present disclosure is to provide a multiphase nanocomposite material that may circumvent the drawbacks and limitations, such as high energy consumption, lengthy processing times, costly precursors, agglomeration, and scalability issues, of existing materials and methods known in the art.

SUMMARY

In an exemplary embodiment, a porous particulate nanocomposite is described. The porous particulate nanocomposite material comprises: carbon; an orthorhombic $CaTiO_3$ crystalline phase; and, a rhombohedral $MgTiO_3$ crystalline phase, as determined by X-ray diffraction (XRD). Further, based on the total number of atoms in the nanocomposite material and as determined by energy dispersive X-ray spectroscopy (EDX): the atomic concentration of carbon (C) is from about 1 to about 5 atom % (at. %); the atomic concentration of titanium (Ti) is from about 20 to about 35 at. %; the atomic concentration of magnesium (Mg) is from about 5 to about 15 at. %; and, the atomic concentration of calcium (Ca) is from about 5 to about 15 at. %.

In some embodiments, the porous particulate nanocomposite material has, based on the total number of atoms in the nanocomposite material: an atomic concentration of C of from about 2 to about 4 at. %; an atomic concentration of Ti of from about 25 to about 30 at. %; an atomic concentration of Mg of from about 5 to about 10 at. %; and, an atomic concentration of Ca of from about 5 to about 10 at. %.

In some embodiments, the porous particulate nanocomposite material has a volume average crystallite size of about 50 to about 55 nanometers (nm), as determined by XRD.

In some embodiments, the porous particulate nanocomposite material has a volume average crystallite size of about 52 to about 54 nm, as determined by XRD.

In some embodiments, the porous particulate nanocomposite material has a heterogeneous morphology comprising substantially spherical particles, flake-like particles, and agglomerates thereof.

In some embodiments, the porous particulate nanocomposite material has a heterogeneous pore size distribution.

In some embodiments, the porous particulate nanocomposite material comprises a first fraction of pores having a diameter greater than about 2 micrometer ($\mu m$) and a second fraction of pores having a diameter less than about 1 $\mu m$, as determined by SEM.

In another exemplary embodiment, a method for preparing the porous particulate nanocomposite material is described. The method comprises: forming a mixture by adding an aqueous solution of a calcium salt and a magnesium salt to a solution in a polar protic solvent of a titanium compound selected from the group consisting of titanium methoxide ($Ti(OMe)_4$), titanium ethoxide ($Ti(OEt)_4$), titanium isopropoxide ($Ti(OiPr)_4$), titanium tert-butoxide ($Ti(O-tBu)_4$) and titanium diisopropoxide bis-acetylacetonate; adding an aqueous solution of a polyol into the mixture to form a gel; heating the gel under stirring at a temperature of from about 100 to about 200 degrees Celsius (° C.) for a sufficient duration to form a dry powder; and, calcining the dry powder at a temperature of from about 600 to about 800° C. to form the nanocomposite material.

In some embodiments, the aqueous solution of the magnesium salt and the calcium salt is added in a dropwise manner into the solution of the titanium compound in the polar protic solvent.

In some embodiments: the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); and, the calcium salt is selected from the group consisting of calcium sulfate (CaSO$_4$), calcium nitrate (Ca(NO$_3$)$_2$), calcium chloride (CaCl$_2$) and calcium acetate (Ca(CH$_3$COO)$_2$).

In some embodiments, the magnesium salt is Mg(NO$_3$)$_2$ and the calcium salt is Ca(NO$_3$)$_2$.

In some embodiments, the titanium compound is titanium tert-butoxide (Ti(O$_t$Bu)$_4$).

In some embodiments, the polar protic solvent is selected from the group consisting of methanol, ethanol, n-propanol, t-butanol, acetic acid and mixtures thereof.

In some embodiments, the polar protic solvent comprises ethanol and/or acetic acid.

In some embodiments, the aqueous solution of the polyol is added in a dropwise manner into the mixture.

In some embodiments, the polyol is selected from the group consisting of sorbitol, maltitol, erythritol, xylitol, mannitol, inositol, lactitol, α-glucopyranosyl-1,6-mannitol, α-glucopyranosyl-1,6-sorbitol, cellobitol, maltotriitol and maltotetraitol.

In some embodiments, the polyol is mannitol.

In some embodiments, the dry powder is calcined at a temperature of from about 600 to about 800° C. for a duration of from about 2 to about 6 hours to form the porous particulate nanocomposite material.

In some embodiments, a method of immobilizing inorganic pollutants disposed in an aqueous medium comprises contacting the aqueous medium with the porous particulate nanocomposite material as defined above and in the appended claims.

In some embodiments, a method of degrading organic pollutants disposed in an aqueous medium comprises contacting the aqueous medium with the porous particulate nanocomposite material as defined above and in the appended claims while irradiating the aqueous medium with actinic irradiation.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
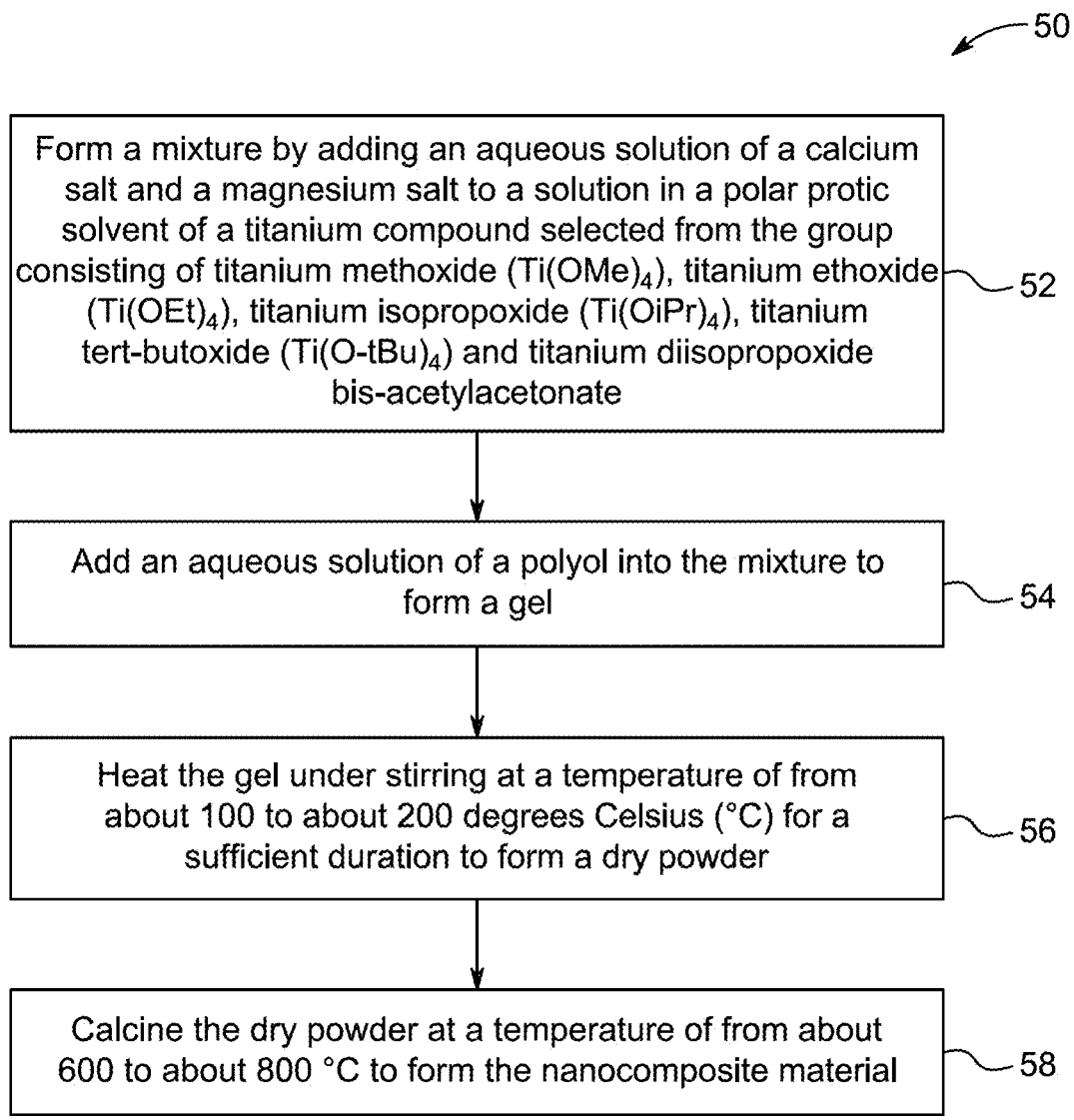
FIG. 1A illustrates an exemplary flow chart for a method of preparing a CaTiO$_3$/MgTiO$_3$/C nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words 'a', 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'room temperature' refers to a temperature range of '25 degrees Celsius (° C.)±3° C. in the present disclosure.

As used herein, the term 'nanocomposite' refers to a composite material in which at least one dimension of the component is in the nanometer size scale (<100 nanometer (nm)). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the invention includes porous media, colloids, gels, copolymers, and solid combination of a bulk matrix and nanodimensional phase(s) differing in properties due to dissimilarities in structure and chemistry. The nanocomposite morphologies that are generally prepared include phase separated systems, intercalated systems, and exfoliated systems.

As used herein, the term 'particle' refers to a small object that acts as a whole unit with regard to its transport and properties. As used herein, the term 'nanoparticles (NPs)' refers to particles having a particle size of 1 nm to 500 nm within the scope of the present invention. It is envisaged, for example, that particles of the nanocomposite that are fibrous, acicular, spherical, ellipsoidal, cylindrical, bead-like, cubic, cuboid or platelet-like may be present alone or in combination. Moreover, it is envisaged that agglomerates of particles having the same or different morphologies may be present in the nanocomposite.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C. and 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'fraction' refers to a numerical quantity which defines a part up to but not including 100 percent or the entirety of the thing in question.

As used herein the term 'disposed' refers to being positioned, placed, deposited, arranged or distributed in a particular manner.

As used herein, the number average molecular weight (Mn) and weight average molecular weight (Mw) are determined by gel permeation chromatography (GPC) with tetrahydrofuran (THF) as the eluent in accordance with DIN 55672-1:2007-08.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, the term 'porosity' refers to a measure of the void or vacant spaces within a material.

As used herein, the term 'porous particulate nanocomposite' refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

As used herein, the term 'X-ray diffraction' or 'XRD' or 'X-ray crystallography' refers to basic technique for obtaining information on the atomic structure of crystalline materials used as a standard laboratory technique.

As used herein, the term 'crystalline phase' refers to a distinct arrangement of atoms or molecules within a material that forms a regular, repeating pattern, resulting in a well-ordered structure. This phase is characterized by long-range atomic or molecular order, which gives rise to specific diffraction patterns when analyzed by techniques such as XRD.

As used herein with respect to X-ray diffraction analysis, "JCPDS" denotes the Joint Committee on Powder Diffraction Standards.

As used herein, the term 'average crystallite size' refers to the mean size of individual crystalline regions within a material, typically measured using techniques such as XRD. It represents the approximate dimension of a crystalline particle in the material and is used to characterize the degree of crystallinity.

A rhombohedral crystalline phase refers to a crystal lattice which has no angles equal to 90°, but of which all sides are of equal length (a=b=c), thus requiring only by one lattice parameter. All three angles are equal ($\alpha=\beta=\gamma$).

An orthorhombic crystalline phase refers to a crystal structure having three mutually perpendicular axes of unequal lengths ($a \neq b \neq c$). This means the crystal lattice forms a rectangular prism where the edges represent the three axes, all intersecting at 90-degree angles ($\alpha=\beta=\gamma=90°$).

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term 'energy-dispersive X-ray spectroscopy" refers to a technique used for the elemental analysis or chemical characterization of a sample. In this method, a sample is bombarded with high-energy X-rays, causing the atoms in the sample to emit characteristic X-rays. The emitted X-rays are then detected and analyzed to identify the elements present in the sample and determine their relative concentrations.

As used herein, the term 'scanning electron microscope (SEM)' refers to a type of electron microscope that uses focused beams of electrons to scan the surface of a sample. This method provides high-resolution images of the sample's surface topography and morphology.

As used herein, the term 'high-resolution transmission electron microscopy (HRTEM)' refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'—alternatively referenced as polyalkylene oxide—refers herein to an aliphatic polyether which is built from repeated —O-A- units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The term "polar solvent" as used herein refers to a solvent having a dielectric constant (F) of more than 5 as measured at 25° C. The determination of dielectric constant (F) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

An aspect of the present disclosure is directed to a $CaTiO_3$/$MgTiO_3$/C nanocomposite (also referred to as porous particulate nanocomposite) fabricated via a sol-gel/combustion approach.

According to a first aspect of the present disclosure, a porous particulate material is described. The porous particulate material includes carbon (C), an orthorhombic calcium titanate ($CaTiO_3$) crystalline phase, and a rhombohedral magnesium titanate ($MgTiO_3$) crystalline phase. The nanocomposite material fabricated by the method of the present disclosure achieves unique crystalline phases, improved structural properties, and controlled morphology.

In some embodiments, based on the total number of atoms in the nanocomposite material and as determined by EDX: the atomic concentration of carbon (C) is from about 1 to about 5 atom % (at. %), for example about 1.2-4.9 at. %, about 1.3-4.8 at. %, about 1.4-4.7 at. %, about 1.5-4.6 at. %, about 1.6-4.5 at. %, about 1.7-4.4 at. %, about 1.8-4.3 at. %, about 1.9-4.2 at. %, about 2.0-4.1 at. %, about 2.1-4.0 at. %, about 2.2-3.9 at. %, about 2.3-3.8 at. %, about 2.4-3.7 at. %, about 2.5-3.6 at. %, about 2.6-3.5 at. %, about 2.7-3.4 at. %, about 2.8-3.3 at. % or about 2.9-3.2 at. %. The atomic concentration of carbon (C) may be from about 2 to about 4 at. %, for example about 2.1-3.9 at. %, about 2.2-3.7 at. %, about 2.3-3.6 at. %, about 2.4-3.5 at. %, about 2.5-3.4 at. % or about 2.6-3.3 at. %, based on the total number of atoms in the porous particulate material.

In some embodiments, the atomic concentration of titanium (Ti), based on the total number of atoms in the nanocomposite material and as determined by EDX, is from about 20 to about 35 at. %, for example about 21-34 at. %, about 22-33 at. %, about 23-32 at. %, about 24-31 at. %, about 25-30 at. %, about 26-29 at. %, or about 27-28 at. %. The atomic concentration of titanium (Ti), based on the total number of atoms in the nanocomposite material and as determined by EDX, may be from about 25 to about 30 at. %, about 25.1-29.9 at. %, about 25.2-29.8 at. %, about 25.3-29.7 at. %, about 25.5-29.5 at. %, about 25.7-29.3 at. %, about 25.9-29.1 at. %, about 26.1-28.9 at. %, about 26.3-28.7 at. %, about 26.5-28.5 at. % and about 27-28 at. %.

In some embodiments, the atomic concentration of magnesium (Mg), based on the total number of atoms in the nanocomposite material and as determined by EDX, is from about 5 to about 15 at. %, about 6-14 at. %, about 6.1-13.9 at. %, about 6.3-13.7 at. %, about 6.5-13.5 at. %, about 6.7-13.3 at. %, about 6.9-13.1 at. %, about 7.1-12.9 at. %, about 7.3-12.7 at. %, about 7.5-12.5 at. %, about 7.7-12.3 at. %, about 7.9-12.1 at. %, about 8.1-11.9 at. %, about 8.3-11.7 at. % or about 8.5-11.5 at. %. The atomic concentration of magnesium (Mg), based on the total number of atoms in the nanocomposite material and as determined by EDX, may be from about 5 to about 10 at. %, about 5.1-9.9 at. %, about 5.3-9.7 at. %, about 5.5-9.5 at. %, about 5.7-9.3 at. %, about 5.9-9.1 at. %, about 6.1-8.9 at. % and or about 6.3-8.7 at. %.

In some embodiments, the atomic concentration of calcium (Ca), based on the total number of atoms in the nanocomposite material and as determined by EDX, is from about 5 to about 15 at. %, for example about 5.1-14.9 at. %, about 5.3-14.7 at. %, about 5.5-14.5 at. %, about 5.7-14.3 at. %, about 5.9-14.1 at. %, about 6.1-13.9 at. %, about 6.3-13.7 at. %, about 6.5-13.5 at. % and about 6.7-13.3 at. %, about 6.9-13.1 at. %, about 7.1-12.9 at. %, about 7.3-12.7 at. %, about 7.5-12.5 at. %, about 7.7-12.3 at. %, about 7.9-12.1 at. % and about 8.1-11.9 at. %. The atomic concentration of calcium (Ca), based on the total of atoms in the nanocomposite material and as determined by EDX, may be from about 5 to about 10 at. %, about 5.1-9.9 at. %, about 5.3-9.7 at. %, about 5.5-9.5 at. %, about 5.7-9.3 at. %, about 5.9-9.1 at. %, about 6.1-8.9 at. %, about 6.3-8.7 at. %, about 6.5-8.5 at. % or about 6.7-8.3 at. %.

In a preferred embodiment, the atomic concentration of C is 3.1 at. %, Ti is 27.7 at. %, Mg is 8.6 at. %, Ca is 8.2 at. % and O is 52.4 at. %, based on the total of atoms in the nanocomposite material and as determined by EDX.

In some embodiments, the porous particulate nanocomposite material may have a volume average crystallite size of from about 50 to about 55 nm, for example about 50.1-54.9 nm, about 50.2-54.8 nm, about 50.4-54.6 nm, about 50.6-54.4 nm, about 50.8-54.2 nm, about 51-54.0, about 51.2-53.8 nm, about 51.4-53.6 nm, about 51.6-53.4 nm or about 51.8-53.2 nm.

In some embodiments, the porous particulate nanocomposite material may have a volume average crystallite size of from about 52 to about 54 nm, for example about 52.1-53.9 nm, about 52.3-53.7 nm, about 52.5-53.5 nm or about 52.7-53.3 nm. In a preferred embodiment, the average crystallite size of the porous particulate material is 53.01 nm.

The nanocomposite material of the present disclosure is porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

In some embodiments, the porous nanocomposite material comprises particles having a flake-like morphology, although other morphologies such as nanowires, nanospheres, nanocrystals, nanoprisms, nanodisks, nanocubes, nanoribbons, nanoblocks, nanotoroids, nanodiscs, nanobarrels, nanogranules, nanowhiskers, nanoflakes, nanofoils, nanobeads, nanobelts, nano-urchins, nanoflowers, nanostars, tetrapods, and their mixtures thereof are also possible.

In a preferred embodiment, the porous nanocomposite material has a porous, granular morphology that includes spherical particles. In a preferred embodiment, the porous particulate nanocomposite material has a heterogeneous pore size distribution and heterogeneous morphology, including substantially spherical particles, flake-like particles, and agglomerates thereof.

In some embodiments, the porous particulate nanocomposite material includes a first fraction of pores having a diameter greater than about 2 µm, as determined by SEM. For example, at least 10% or at least 20% of the pores of the porous particulate nanocomposite may have a diameter greater than 2.0 µm, greater than about 2.1 µm, such as greater than about 2.2 µm, greater than about 2.3 µm, greater than about 2.4 µm, greater than about 2.5 µm, greater than about 2.6 µm, greater than about 2.7 µm, greater than about 2.8 µm, greater than about 2.9 µm, greater than about 3.0 µm, greater than about 3.1 µm, greater than about 3.2 µm, greater than about 3.3 µm, greater than about 3.4 µm or greater than about 3.5 micrometers (µm). The porous particulate nanocomposite material may further include a second fraction of pores having a diameter less than about 1 µm, as determined by SEM. For example, at least 10% or at least 20% of the pores of the porous particulate nanocomposite may have a diameter less than about 1.0 am, less than about 0.9 µm, less than about 0.8 µm, less than about 0.7 µm, less than about 0.6 µm, less than about 0.5 µm, less than about 0.4 µm, less than about 0.3 µm, less than about 0.2 µm, or less than about 0.1 µm, as determined by SEM.

FIG. 1A illustrates a schematic flow chart of a method 50 of preparing the porous particulate $CaTiO_3/MgTiO_3/C$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a mixture by adding an aqueous solution of a calcium salt and a magnesium salt to a solution in a polar protic solvent of a titanium compound selected from the group consisting of titanium methoxide ($Ti(OMe)_4$), titanium ethoxide ($Ti(OEt)_4$), titanium isopropoxide ($Ti(OiPr)_4$), titanium tert-butoxide ($Ti(O\text{-}tBu)_4$) and titanium diisopropoxide bis-acetylacetonate. In a preferred embodiment, the titanium compound is titanium butoxide ($Ti(O\text{-}tBu)_4$).

In some embodiments, the magnesium salt is selected from the group consisting of magnesium sulfate ($MgSO_4$), magnesium nitrate ($Mg(NO_3)_2$), magnesium chloride ($MgCl_2$), magnesium acetate ($Mg(CH_3COO)_2$) and mixtures thereof. In some embodiments, the calcium salt is selected from the group consisting of calcium sulfate ($CaSO_4$), calcium nitrate ($Ca(NO_3)_2$), calcium chloride ($CaCl_2$), calcium acetate ($Ca(CH_3COO)_2$) and mixtures thereof. In a preferred embodiment: the magnesium salt is magnesium nitrate ($Mg(NO_3)_2$), more preferably magnesium nitrate hexahydrate ($Mg(NO_3)_2 \cdot 6H_2O$); the calcium salt is calcium nitrate ($Ca(NO_3)_2$), more preferably calcium nitrate tetrahydrate ($Ca(NO_3)_2 \cdot 4H_2O$); and, the titanium compound is titanium tert-butoxide ($Ti(OtBu)_4$).

The calcium salt and the magnesium salt are dissolved in water to form the aqueous solution. Water may be tap water, distilled water, double-distilled water, deionized water, deionized distilled water, reverse osmosis water, and/or some other water.

In some embodiments, the molar concentration of the magnesium salt, preferably magnesium nitrate hexahydrate ($Mg(NO_3)_2 \cdot 6H_2O$) in the aqueous solution is in the range of from about 0.1 to about 0.5 M, for example about 0.2 to about 0.4 M, about 0.3 to about 0.375 M, about 0.325 to about 0.375 M, about 0.35 to about 0.375 M, or about 0.36 M. In some embodiments, the molar concentration of the calcium salt, preferably calcium nitrate tetrahydrate (Ca $(NO_3)_2 \cdot 4H_2O$), in the aqueous solution is in the range of from about 0.1 to about 0.5 M, for example about 0.2 to about 0.4 M, about 0.3 to about 0.375 M, about 0.325 to about 0.375 M, about 0.35 to about 0.375 M, or about 0.36 M. In some embodiment, the molar ratio of the magnesium salt to the calcium salt is from about 1:5 to about 5:1, for example about 1:4 to about 4:1, about 1:3 to 3:1, about 1:2 to 2:1, or about 1:1.

The aqueous solution of the magnesium salt and the calcium salt is desirably added dropwise into the polar protic solvent of the titanium compound. In some embodiments, the polar protic solvent is selected from methanol, ethanol, n-propanol, t-butanol, acetic acid, and mixtures thereof. In some embodiments, the polar protic solvent comprises ethanol and/or acetic acid. In a preferred embodiment, the polar protic solvent comprises ethanol and glacial acetic acid. The volume to volume (v/v) ratio of ethanol to glacial acetic acid in this embodiment is desirably in the range of from about 1:5 to about 5:1, for example about 1:4 to about 1:1, about 1:3 to about 1:1, or about 1:2 to about 1:1. In a preferred embodiment, the v/v ratio of ethanol to glacial acetic acid is about 1:3.

At step 54, the method 50 includes adding an aqueous solution of a polyol into the mixture to form a gel. The polyol is desirably added in a dropwise manner into the aqueous mixture. In some embodiments, the polyol has a number average molecular weight of from about 200 to about 5000 g/mol. and a hydroxyl number of from about 25 to about 500 mg KOH/g.

Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxyalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl)propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy($C_2$-$C_3$)alkylene polyol.

In a particularly preferred embodiment, the polyol is selected from the group consisting of: sorbitol; maltitol; erythritol; xylitol; mannitol; inositol; lactitol; α-glucopyranosyl-1,6-mannitol; α-glucopyranosyl-1,6-sorbitol; cellobitol; maltotriitol; and, maltotetraitol. In an exemplary embodiment, the polyol comprises or consists of mannitol.

At step 56, the method 50 includes heating the gel under stirring at a temperature of from about 100 to about 200° C. for a sufficient duration to form a dry powder. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the method includes heating the gel under stirring at a temperature of from about 100 to about 200° C., for example about 105-195° C., about 110-190° C., about 115-185° C., about 120-180° C., about 125-175° C., about 130-170° C., about 135-165° C., about 140-160° C., or about 145-155° C. for a sufficient duration to form a dry powder. In a preferred embodiment, the gel is heated at about 150° C. under continuous stirring.

At step 58, the method 50 includes calcining the dry powder at a temperature of about 600 to about 800° C. to form the nanocomposite material. The calcination of the precipitate is carried out by heating it to a high temperature, under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C. per minute (° C./min), for example up to about 40° C./min, up to about 30° C./min, up to about 20° C./min, up to about 10° C./min, up to about 5° C./min, up to about 2° C./min, or up to about 1° C./min.

In some embodiments, the dry powder is calcined: at a temperature of from about 600 to about 800° C., for example about 610-790° C., about 620-780° C., about 630-770° C., about 640-760° C., about 650-750° C., about 660-740° C., about 670-730° C., about 680-720° C. or about 690-710° C.; for a duration of from about 2 to about 6 hours (h), for example about 2.5-5.5 h or about 3-5 h to form the porous particulate nanocomposite material. In a preferred embodiment, the dry powder is calcined at about 700° C. for about 3 hours to obtain the porous particulate $CaTiO_3/MgTiO_3/C$ nanocomposite material.

It is not precluded in the present method, that the particles directly obtained from the calcination step may be subjected to at least one of comminution, homogenization or classification in order to moderate the particle size distribution thereof.

In another aspect, a method of immobilizing inorganic pollutants disposed in an aqueous medium includes contacting the aqueous medium with the porous particulate nanocomposite material. In some embodiments, the inorganic pollutants may include heavy metals such as Pb, mercury Hg, Cd, and As, as well as radioactive isotopes like cesium-137 (Cs-137) and strontium-90 (Sr-90). These pollutants are commonly found in industrial wastewater, mining effluents, and other polluted environments, and they can be efficiently removed or neutralized through various treatment methods, including photocatalytic degradation or adsorption onto nanocomposite materials.

A method of degrading organic pollutants disposed in an aqueous medium is still further described. The method includes contacting the aqueous medium under actinic irradiation with the porous particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the porous particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the porous particulate nanocomposite material. In this embodiment, the porous particulate nanocomposite material may need to constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a porous nanocomposite material and a method of production thereof. The examples are provided solely for illustration and are not to be construed as limitations of the present disclosure, as many variations thereof are possible without departing from the spirit and scope of the present disclosure.

Figure 1B:
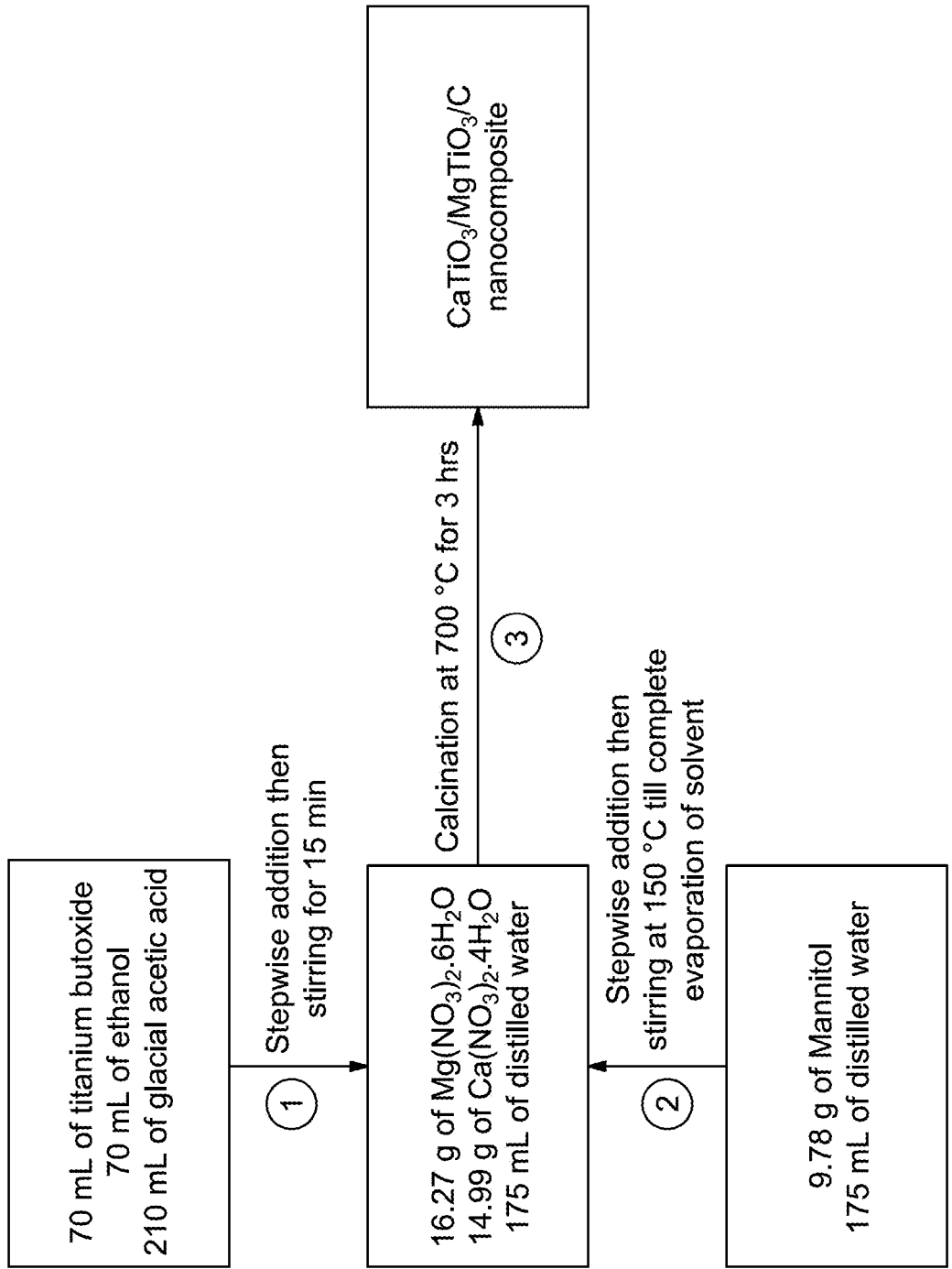
FIG. 1B illustrates an exemplary block diagram depicting the method of producing the CaTiO$_3$/MgTiO$_3$/C nanocomposite, according to certain embodiments.

Example 1: Synthesis of Calcium Titanate/Magnesium Titanate/Carbon ($CaTiO_3/MgTiO_3/C$) Nanocomposite Using Sol-Gel/Combustion Method The $CaTiO_3/MgTiO_3/C$ nanocomposite was synthesized using a sol-gel/combustion method, as described in FIG. 1B. In particular, the method includes dissolving 70 milliliters (mL) of titanium butoxide ($Ti(OtBu)_4$) in a mixture of 70 mL of ethanol and 210 mL of glacial acetic acid. Further, 16.27 gram (g) of magnesium nitrate hexahydrate ($Mg(NO_3)_2 \cdot 6H_2O$) and 14.99 g of calcium nitrate tetrahydrate ($Ca(NO_3)_2 \cdot 4H_2O$) were dissolved in 175 mL of distilled water and gradually introduced into the titanium butoxide solution under continuous stirring for 15 minutes. Subsequently, 9.78 g of mannitol was dissolved in 175 mL of distilled water and added stepwise to the previous mixture under continuous stirring at 150° C. until complete solvent evaporation. The resultant powder was then dried and calcined at 700° C. for 3 hours (h) to produce the $CaTiO_3/MgTiO_3/C$ nanocomposite (also referred to as a nanocomposite).

Figure 2:
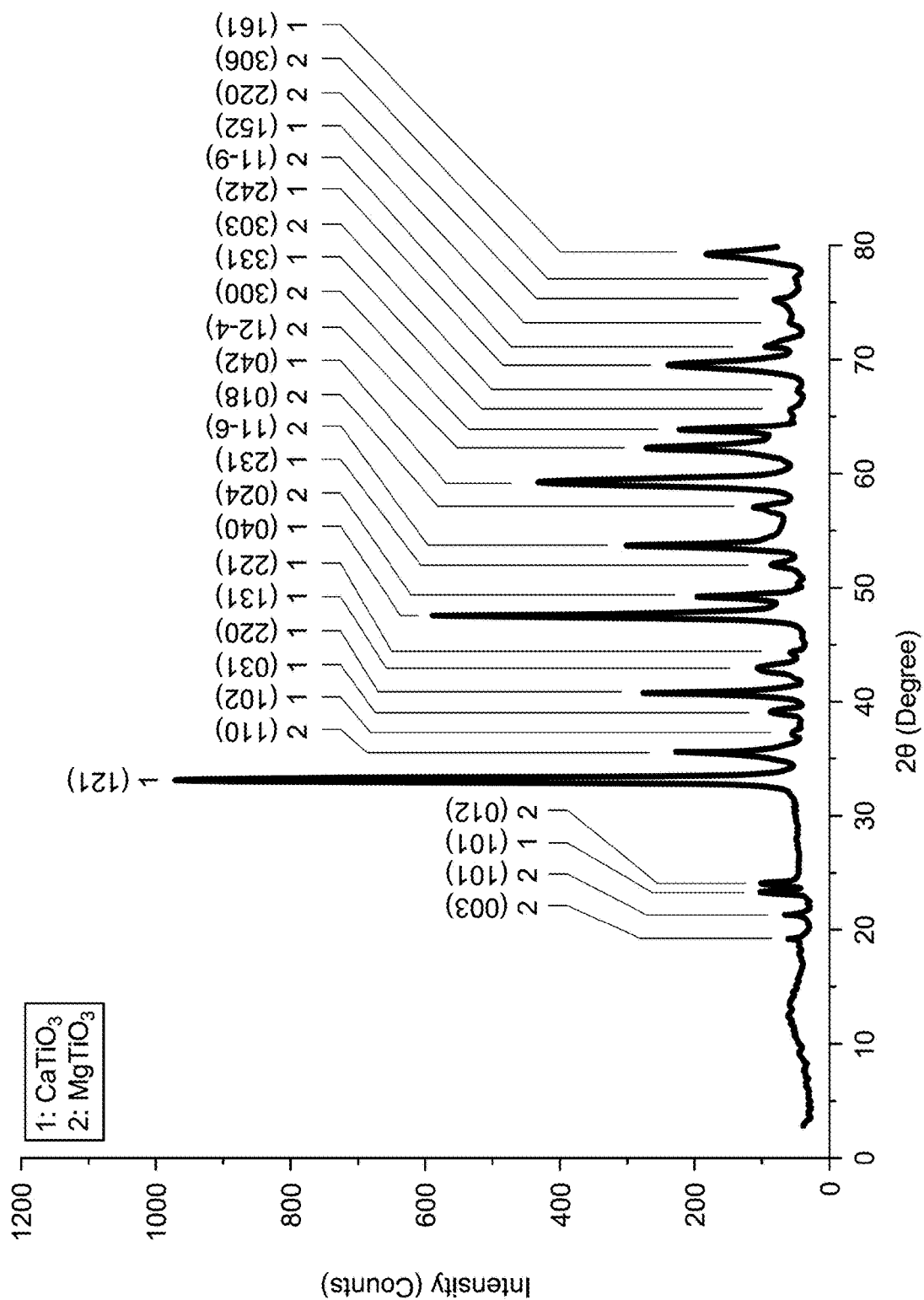
FIG. 2 is a graph depicting an X-ray diffraction (XRD) pattern of the CaTiO$_3$/MgTiO$_3$/C nanocomposite, according to certain embodiments.

X-ray diffraction (XRD) patterns for the nanocomposite are shown in FIG. 2 and the structural and crystallographic properties are summarized in Table 1. The nanocomposite includes two distinct phases, $CaTiO_3$ and $MgTiO_3$. The orthorhombic $CaTiO_3$ phase was identified using JCPDS card number 00-022-0153, the disclosure of which is incorporated herein by reference in its entirety, which card showed diffraction peaks at 2θ values of 23.29°, 33.05°, 37.14°, 39.03°, 40.71°, 42.92°, 44.27°, 47.64°, 51.93°, 59.17°, 65.48°, 69.46°, 73.14°, and 79.11°, corresponding to the Miller indices (101), (121), (102), (031), (220), (131), (221), (040), (231), (042), (331), (242), (152), and (161), respectively. The rhombohedral $MgTiO_3$ phase, identified using card number JCPDS-01-084-4303, the disclosure of which is incorporated herein by reference in its entirety, exhibited peaks at 2θ values of 19.19°, 21.30°, 24.02°, 35.46°, 49.10°, 53.61°, 56.98°, 62.11°, 63.80°, 67.25°, 71.24°, 75.13°, and 76.92°, corresponding to the Miller indices (003), (101), (012), (110), (024), (1 1-6), (018), (1 2-4), (300), (303), (1 1-9), (220), and (306), respectively. The average crystallite size of the synthesized nanocomposite is 53.01 nanometer (nm).

TABLE 1

Structural and crystallographic properties of the nanocomposite components, as determined by XRD.

| Components of the nanocomposite | | | | Average crystallite size of the nanocomposite |
|---|---|---|---|---|
| Phase | Chemical name | Card No. | Crystal system | (nm) |
| $CaTiO_3$ | Calcium titanium oxide | JCPDS-00-022-0153 | Orthorhombic | 53.01 |
| $MgTiO_3$ | Magnesium titanium oxide | JCPDS-01-084-4303 | Rhombohedral | |

Figure 3:
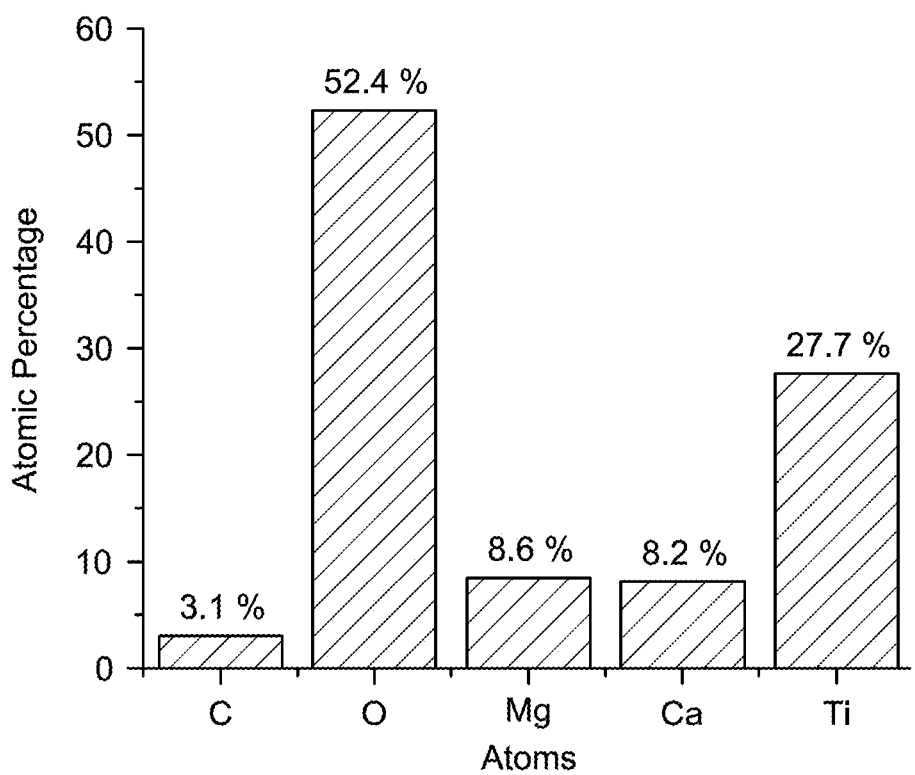
FIG. 3 is a graph depicting a distribution of atomic percentages of elements in the CaTiO$_3$/MgTiO$_3$/C nanocomposite, according to certain embodiments.

Further, FIG. 3 illustrates the distribution of atomic percentages of elements in the nanocomposite as determined by energy-dispersive X-ray spectroscopy (EDX). The EDX analysis revealed that oxygen constitutes the highest atomic percentage at 52.4 atom %, followed by titanium at 27.7 atom %, magnesium at 8.6 atom %, calcium at 8.2 atom %, and carbon at 3.1 atom %. The carbon percentage was attributed to residual carbon from the combustion step of the synthesis process. These results confirmed the successful incorporation of the expected elemental components into the $CaTiO_3/MgTiO_3/C$ nanocomposite, with oxygen and titanium dominating the composition, consistent with the oxide-based crystalline phases of the material.

Figure 4:
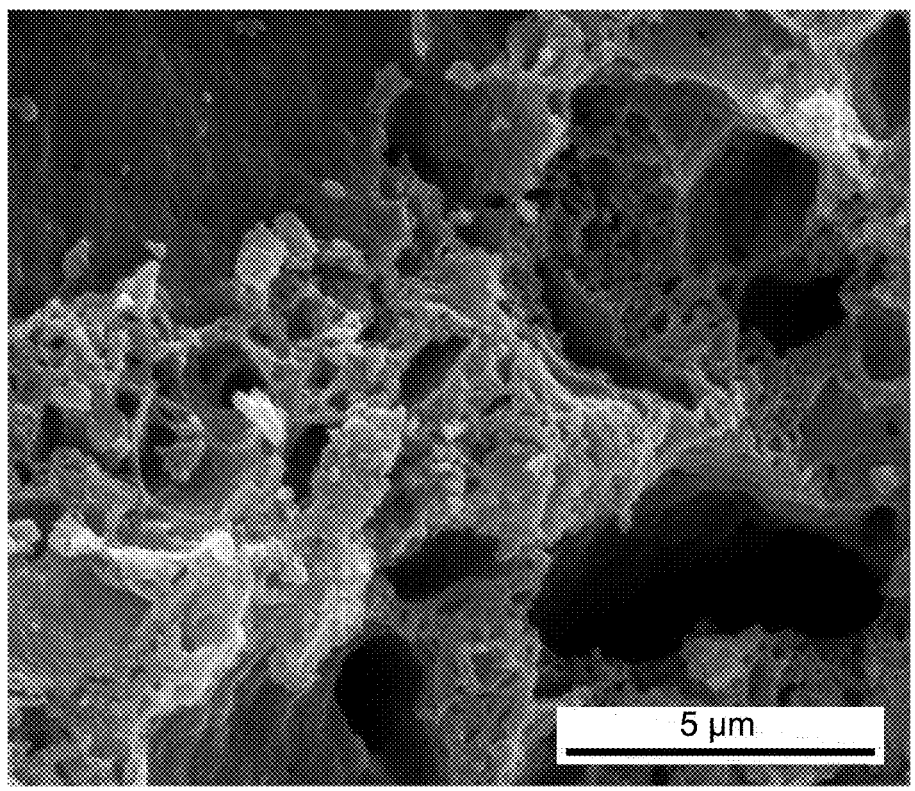
FIG. 4 shows a scanning electron microscope (SEM) image of the CaTiO$_3$/MgTiO$_3$/C nanocomposite, according to certain embodiments.

FIG. 4 presents the Scanning Electron Microscope (SEM) image of the nanocomposite, highlighting its morphological features and structural characteristics. The image revealed a porous architecture with interconnected voids and cavities formed by aggregated clusters of irregularly shaped particles. The observed morphology includes spherical particles, flaky structures, and irregular aggregates thereof. These distinct features confirm the successful formation of the nanocomposite with a well-defined porous and heterogeneous structure.

A heterogeneity was observed in the pore sizes of the nanocomposite material of FIG. 4. Large pores, having pore diameters of greater than 2 μm and even greater than 3 μm are observable. Further, a fraction of the visible pores have pore diameters less than 1 μm, and even less than 0.8 or less than 0.5 μm, as determined from the Scanning Electron Microscope (SEM) image. There is little regularity in the distribution of these larger and smaller pores.

Figure 5:
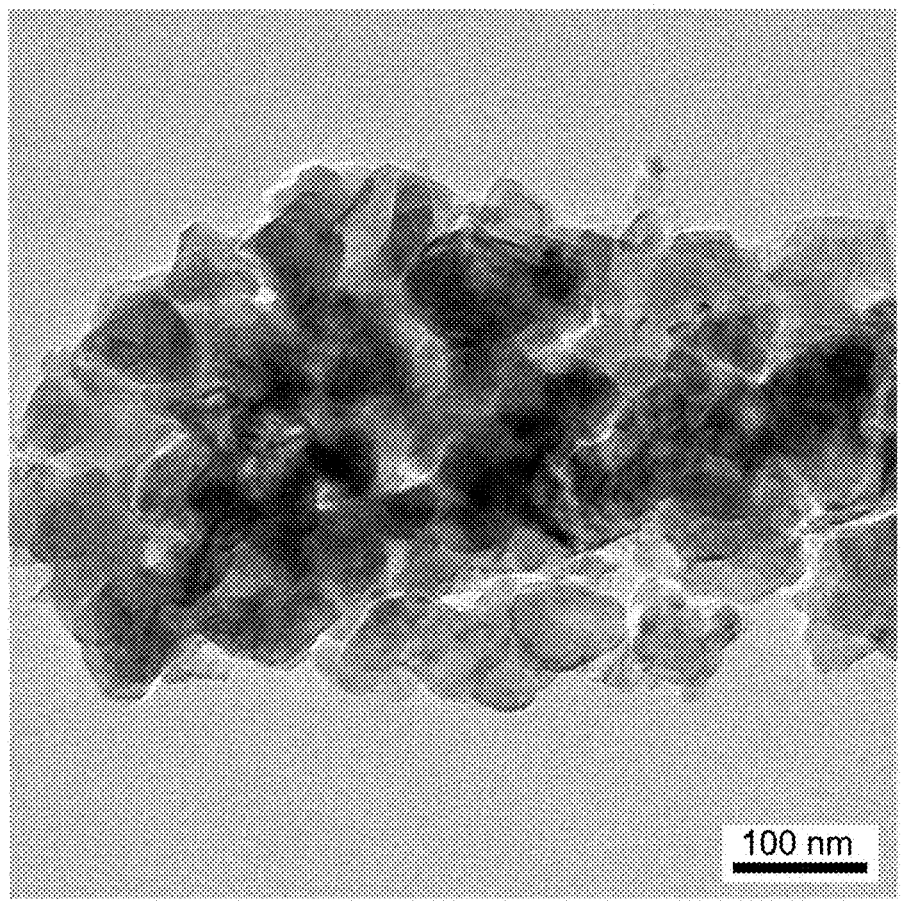
FIG. 5 shows a high-resolution transmission electron microscope (HRTEM) image of the CaTiO$_3$/MgTiO$_3$/C nanocomposite, according to certain embodiments.

High-resolution transmission electron microscope (HR-TEM) image of the nanocomposite is depicted in FIG. 5. The obtained image identified the nanoscale morphology. In particular, FIG. 5 shows that the nanocomposite consists of aggregated spherical and irregularly shaped particles with clear boundaries, indicating the crystalline nature of the material. The average particle diameter, calculated from the HRTEM analysis was 53.01 nm. The observed shapes and sizes confirmed the successful synthesis of the nanocomposite with well-defined nanostructured features.

The aspects of the present disclosure provide the successful synthesis and characterization of a $CaTiO_3/MgTiO_3/C$ nanocomposite. XRD analysis confirms the formation of two distinct crystalline phases, $CaTiO_3$ and $MgTiO_3$, with well-defined crystallographic properties. The average crystallite size of the nanocomposite is 53.01 nm, and EDX reveals the incorporation of oxygen, titanium, magnesium, calcium, and carbon in the expected proportions. SEM and high-resolution HRTEM images confirmed the porous, heterogeneous morphology and nanoscale particle distribution. These results demonstrate the successful formation of a nanocomposite with well-defined crystalline and structural features suitable for potential applications in various technological fields.

The $CaTiO_3/MgTiO_3/C$ nanocomposite holds potential for commercial applications in environmental remediation, such as removing heavy metal ions and organic pollutants from water. Its unique structural and compositional properties make it suitable for advanced energy storage devices, including supercapacitors and batteries. Additionally, its high crystallinity and stability makes it suitable in applications in catalysis and electronic devices, enhancing performance in industrial and technological sectors.

Numerous modifications and variations of the present disclosure are possible in light of the above teachings. It is, therefore, to be understood that within the scope of the appended claims, the invention may be practiced otherwise than as specifically described herein.

The invention claimed is:

1. A porous particulate nanocomposite material comprising, as determined by X-ray diffraction:
   carbon;
   an orthorhombic calcium titanate ($CaTiO_3$) crystalline phase; and,
   a rhombohedral magnesium titanate ($MgTiO_3$) crystalline phase,
   wherein, based on the total number of atoms in the nanocomposite material and as determined by energy dispersive X-ray spectroscopy (EDX):
   the atomic concentration of carbon (C) is from about 1 to about 5 atom % (at. %);
   the atomic concentration of titanium (Ti) is from about 20 to about 35 at. %;
   the atomic concentration of magnesium (Mg) is from about 5 to about 15 at. %; and,
   the atomic concentration of calcium (Ca) is from about 5 to about 15 at. %.

2. The porous particulate nanocomposite material according to claim 1, wherein based on the total number of atoms in the nanocomposite material:
   the atomic concentration of C is from about 2 to about 4 at. %;

the atomic concentration of Ti is from about 25 to about 30 at. %;

the atomic concentration of Mg is from about 5 to about 10 at. %; and, the atomic concentration of Ca is from about 5 to about 10 at. %.

3. The porous particulate nanocomposite material according to claim 1 having a volume average crystallite size, as determined by X-ray diffraction, of from about 50 to about 55 nanometer (nm).

4. The porous particulate nanocomposite material according to claim 1 having a volume average crystallite size, as determined by X-ray diffraction, of from about 52 to about 54 nm.

5. The porous particulate nanocomposite material according to claim 1 having a heterogeneous morphology comprising substantially spherical particles, flake-like particles and agglomerates thereof.

6. The porous particulate nanocomposite material according to claim 1 having a heterogeneous pore size distribution.

7. The porous particulate nanocomposite material according to claim 1, wherein the material comprises, as determined by scanning electron microscopy (SEM):

a first fraction of pores having a diameter greater than about 2 micrometer (μm); and, a second fraction of pores having a diameter less than about 1 μm.

8. A method for preparing the porous particulate nanocomposite material as defined in claim 1, the method comprising:

forming a mixture by adding an aqueous solution of a calcium salt and a magnesium salt to a solution in a polar protic solvent of a titanium compound selected from the group consisting of titanium methoxide (Ti(OMe)$_4$), titanium ethoxide (Ti(OEt)$_4$), titanium isopropoxide (Ti(OiPr)$_4$), titanium tert-butoxide (Ti(OtBu)$_4$) and titanium diisopropoxide bis-acetylacetonate;

adding an aqueous solution of a polyol into the mixture to form a gel;

heating the gel under stirring at a temperature of from about 100 to about 200° C. for a sufficient duration to form a dry powder; and, calcining the dry powder at a temperature of from about 600 to about 800° C. to form the nanocomposite material.

9. The method according to claim 8, wherein the aqueous solution of the magnesium salt and the calcium salt is added in a dropwise manner into the solution of the titanium compound in the polar protic solvent.

10. The method according to claim 8, wherein:

the magnesium salt is selected from the group consisting of magnesium sulfate (MgSO$_4$), magnesium nitrate (Mg(NO$_3$)$_2$), magnesium chloride (MgCl$_2$) and magnesium acetate (Mg(CH$_3$COO)$_2$); and, the calcium salt is selected from the group consisting of calcium sulfate (CaSO$_4$), calcium nitrate (Ca(NO$_3$)$_2$), calcium chloride (CaCl$_2$) and calcium acetate (Ca(CH$_3$COO)$_2$).

11. The method according to claim 8, wherein:

the magnesium salt is magnesium nitrate (Mg(NO$_3$)$_2$); and, the calcium salt is calcium nitrate (Ca(NO$_3$)$_2$).

12. The method according to claim 8, wherein the titanium compound is titanium tert-butoxide (Ti(OtBu)$_4$).

13. The method according to claim 8, wherein the polar protic solvent is selected from the group consisting of: methanol; ethanol; n-propanol; t-butanol; acetic acid; and, mixtures thereof.

14. The method according to claim 8, wherein the polar protic solvent comprises ethanol and/or acetic acid.

15. The method according to claim 8, wherein the aqueous solution of the polyol is added in a dropwise manner into the mixture.

16. The method according to claim 8, wherein the polyol is selected from the group consisting of: sorbitol; maltitol; erythritol; xylitol; mannitol; inositol; lactitol; α-glucopyranosyl-1,6-mannitol; α-glucopyranosyl-1,6-sorbitol; cellobitol; maltotriitol; and, maltotetraitol.

17. The method according to claim 8, wherein the polyol is mannitol.

18. The method according to claim 8, wherein the dry powder is calcined at a temperature of from about 600 to about 800° C. for a duration of from about 2 to about 6 hours to form the porous particulate nanocomposite material.

19. A method of immobilizing inorganic pollutants disposed in an aqueous medium, the method comprising contacting the aqueous medium with the porous particulate nanocomposite material as defined in claim 1.

20. A method of degrading organic pollutants disposed in an aqueous medium, the method comprising contacting the aqueous medium with the porous particulate nanocomposite material as defined in claim 1 while irradiating the aqueous medium with actinic irradiation.

* * * * *